United States Patent [19]

Suzuki

[11] Patent Number: 5,333,073
[45] Date of Patent: Jul. 26, 1994

[54] BACKLIGHT DEVICE AND LIQUID CRYSTAL DISPLAY HAVING CONDUCTIVE FILM ON ELECTROMAGNETIC SHIELD OR DIFFUSER BETWEEN FLUORESCENT TUBES AND DISPLAY

[75] Inventor: Mitsuhiro Suzuki, Tokyo, Japan
[73] Assignee: NEC Corporation, Tokyo, Japan
[21] Appl. No.: 997,939
[22] Filed: Dec. 29, 1992
[30] Foreign Application Priority Data
  Jan. 9, 1992 [JP] Japan ............................... 4-001965
[51] Int. Cl.$^5$ .................. G02F 1/1335; G02F 1/1333
[52] U.S. Cl. ........................................ 359/50; 359/69; 359/83
[58] Field of Search ........................... 359/50, 69, 83

[56] References Cited

U.S. PATENT DOCUMENTS

| | | | |
|---|---|---|---|
| 4,795,941 | 1/1989 | Noda | 313/479 |
| 4,936,659 | 6/1990 | Anderson et al. | 359/49 |
| 5,029,986 | 7/1991 | De Vann | 359/49 |
| 5,143,433 | 9/1992 | Farrell | 359/50 |
| 5,195,822 | 3/1993 | Takahashi et al. | 359/48 |
| 5,214,522 | 5/1993 | Tagawa | 359/50 |

*Primary Examiner*—Anita P. Gross
*Attorney, Agent, or Firm*—Young & Thompson

[57] ABSTRACT

A liquid crystal display equipment comprising a liquid crystal display panel for displaying therein characters or an image, a backlight device serving as an auxiliary device to finely display the characters or image in the display panel by irradiating a light from the back of the liquid crystal display panel, and a sheet of light diffusion plate mounted between the liquid crystal display panel and the backlight device and making a uniform illumination plane for the display panel by diffusing the light through itself. The backlight device comprises a transparent conductive film mounted in the vicinity of a plurality of fluorescent lamps arranged in parallel relationship to one another on the back side of the light diffusion plate so as to act as a backlight source of the backlight device.

7 Claims, 4 Drawing Sheets

BACKLIGHT DEVICE AND LIQUID CRYSTAL DISPLAY HAVING CONDUCTIVE FILM ON ELECTROMAGNETIC SHIELD OR DIFFUSER BETWEEN FLUORESCENT TUBES AND DISPLAY

BACKGROUND OF THE INVENTION

1. Field of the Invention

This invention relates to a backlight device and a liquid crystal display equipment with the backlight device, in particular to a backlight device which does not have influence of electromagnetic interference upon a displaying operation of a liquid crystal display panel, and a liquid crystal crystal display equipment with the backlight device.

2. Description of the Prior Art

In recent years, liquid crystal display panels have been used as image displaying planes of personal computers, word processors, various meters, television sets, etc. A backlight device has been used as an auxiliary device to finely display characters or images in the display panel by irradiating a light from the back of the display panel.

The conventional backlight device has a plurality of fluorescent lamps as a light source thereof and a light diffusion plate for making a uniform illumination plane by diffusing the light irradiated from the fluorescent lamps and transmitting therethrough. Each of the fluorescent lamps is so designed as to be irradiated by an electric discharge. Therefore, in order to ensure the discharge and the lighting of the fluorescent lamps, alternating voltage of 1000V is applied to the lamps from an electric power source through an inverter circuit substrate.

The fluorescent lamps are so made as to switch on by applying thereto such a high AC voltage as described above. Accordingly, an electromagnetic field having a high intensity is generated around each of the fluorescent lamps lighted. As a result, in the conventional backlight device, there has been such a troublesome problem that the high intensity electromagnetic field causes interference with operating signals for the liquid crystal display panel, so that a striped pattern is generated in the display panel which makes it difficult to see an image or characters displayed in the liquid crystal display panel.

SUMMARY OF THE INVENTION

The present invention has been made in view of the above-mentioned circumstances, and has for its object to provide a backlight device which can prevent operating signals for a liquid crystal display panel from interfering with an electromagnetic field of a high intensity generated around a plurality of fluorescent lamps used as a backlight source and also provide a liquid crystal display equipment having the backlight device.

In order to achieve the above object, according to a first aspect of the present invention, there is provided a backlight device comprising a transparent conductive film mounted in the vicinity of a plurality of fluorescent lamps arranged in parallel relationship to one another on the back side of a liquid crystal display panel so as to act as a backlight source of the display panel.

According to a first exemplified embodiment of the present invention, there is provided a backlight device as set forth in the above first aspect wherein the transparent conductive film is formed on the surface of an electromagnetic shielding member mounted between the fluorescent lamps and a sheet of light diffusion plate arranged on the back side of the liquid crystal display panel for diffusing the light irradiated from the fluorescent lamps to the liquid crystal display panel.

According to a second exemplified embodiment of the present invention, there is provided a backlight device as set forth in the above first aspect wherein the transparent conductive film is formed on the surface of a sheet of light diffusion plate arranged on the back side of the liquid crystal display panel for diffusing the light irradiated from the fluorescent lamps to the liquid crystal display panel.

According to a third exemplified embodiment of the present invention, there is provided a backlight device as set forth in the above first embodiment wherein the transparent conductive film is formed on both the front and the rear surfaces of the electromagnetic shielding member.

According to a fourth exemplified embodiment of the present invention, there is provided a backlight device as set forth in the above second embodiment wherein the transparent conductive film is formed on both the front and the rear surfaces of the light diffusion plate.

According to a fifth exemplified embodiment of the present invention, there is provided a backlight device as set forth in the above first embodiment wherein the electro-magnetic shielding member comprises a transparent polyester film, an In-Sn oxide film formed on the polyester film as the transparent conductive film, an aluminium pattern formed on the surface of the oxide film, and a thin over-coating layer formed on and over surfaces of the aluminium pattern and the oxide film.

According to a sixth exemplified embodiment of the present invention, there is provided a backlight device as set forth in the above fifth embodiment wherein the aluminium pattern is formed so as to rim all edge portions of the In-Sn oxide film.

According to a seventh exemplified embodiment of the present invention, there is provided a backlight device as set forth in the above fifth embodiment wherein the aluminium pattern is formed so as to rim all edge portions of the In-Sn oxide film and also formed at such portions on the surface of the oxide film as corresponding to the fluorescent lamps, respectively.

According to an eighth exemplified embodiment of the present invention, there is provided a backlight device as set forth in the above seventh embodiment wherein the aluminium pattern formed at such portions on the surface of the oxide film as corresponding to the fluorescent lamps, respectively, has a great number of light transmitting holes each of whose size is adjusted in proportion to the degree of luminous intensity to pass therethrough.

According to a ninth exemplified embodiment of the present invention, there is provided a backlight device as set forth in the above first embodiment wherein the electro-magnetic shielding member comprises a transparent polyester film, In-Sn oxide films foraged on both the front and the rear surfaces of the polyester film as the transparent conductive film, aluminium patterns each formed on the outer surface of each of the oxide film, and thin over-coating layers each formed on and over the surfaces of each of the aluminium patterns and each of the oxide films.

Further, in order to achieve the foregoing object, according to a second aspect of the present invention, there is provided a liquid crystal display equipment having a backlight device as set forth in one of the above-mentioned first aspect and first to ninth embodiments.

As is clearly understood from the above description, the present invention has the following advantages.

It becomes possible to remove a striped pattern which has been generated in a liquid crystal display panel and which makes it hard to see an image or characters displayed in the liquid crystal display panel, because an electromagnetic field generated around a plurality of fluorescent lamps can be prevented from interfering with operating signals for the liquid crystal display panel by making use of a backlight device having an electromagnetic shielding member mounted in the vicinity of the fluorescent lamps.

In addition, by adopting such a backlight device as mentioned above in the liquid crystal display equipment, it becomes further possible to produce a remarkably thinner liquid crystal display equipment thereby expecting an enlargement of its market.

Still further, the liquid crystal display equipment can restrain faults due to electromagnetic waves directed to other surrounding equipments.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

Hereinafter, some preferred embodiments of the present invention are described in detail with reference to the accompanying drawings.

Figure 1:
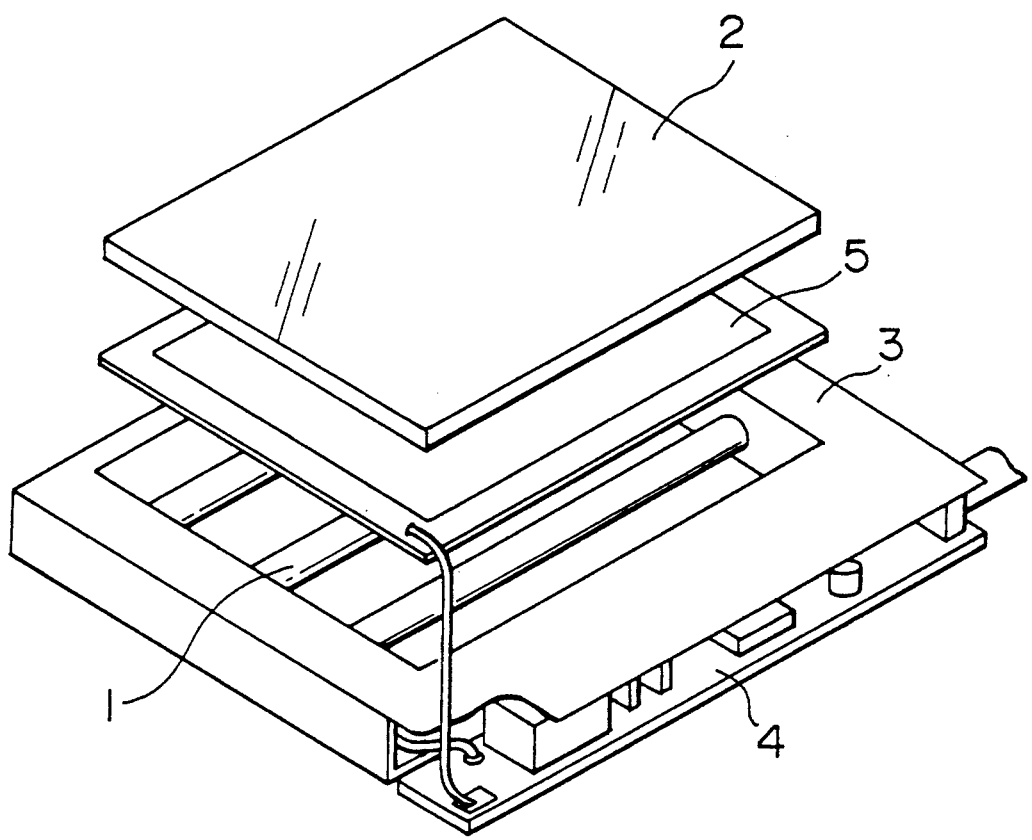
FIG. 1 is a schematic perspective view showing a first embodiment of a backlight device of the present invention.

FIG. 1 is a schematic perspective view showing a detailed structure of a backlight device which is a first embodiment of the present invention.

In the first embodiment, the backlight device includes a plurality of fluorescent lamps 1 housed within an open lamp case 3 in parallel to one another so as to be a light source of the backlight device, a sheet of light diffusion plate 2 arranged between the fluorescent lamps 1 and a liquid crystal display panel (not shown) for making a uniform illumination plane for the liquid crystal display panel by diffusing the light therethrough, an inverter circuit substrate 4 mounted in the vicinity of the lamp case 3 for applying a lighting voltage to the fluorescent lamps 1, and an electromagnetic shielding member 5 arranged between the fluorescent lamps 1 and the light diffusion plate 2 so as to protect the liquid crystal display panel from being affected by an electromagnetic field generated around the fluorescent lamps 1.

Figure 2:
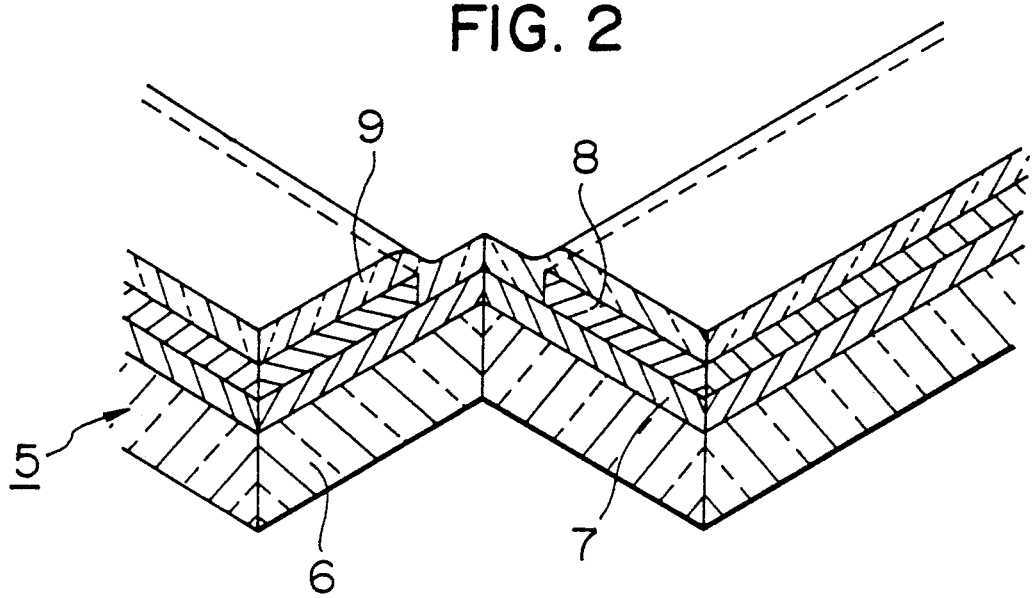
FIG. 2 is a fragmentary sectional perspective view of an electromagnetic shielding member used in the first embodiment shown in FIG. 1.

As shown in detail in FIG. 2, the electromagnetic shielding member 5 is made by the following process. Namely, in the first place, an In-Sn oxide film 7 as a transparent conductive material is formed by a cathode sputtering method on a transparent plastic film such as, for example, a transparent polyester film 6, and then an aluminium pattern 8 is formed by a vapor deposition method on the surface of the In-Sn oxide film 7 so as to rim all edges of the oxide film 7. Further, as the last step, a thin over-coating layer 9 is formed by a printing method on and over the surfaces of the In-Sn oxide film 7 and the aluminium pattern 8 for improving the light transmitting rate through the electromagnetic shielding member 5 and preventing the aluminium pattern 8 from corrosion thereof.

In the above-described arrangement of the backlight device, when the aluminium pattern 8 is connected through a conductive wire to a ground of the inverter circuit substrate 4, the intensity of electromagnetic field on the light diffusion plate is remarkably reduced with the result that it becomes possible to remove a striped pattern in the liquid crystal display panel.

Figure 3:
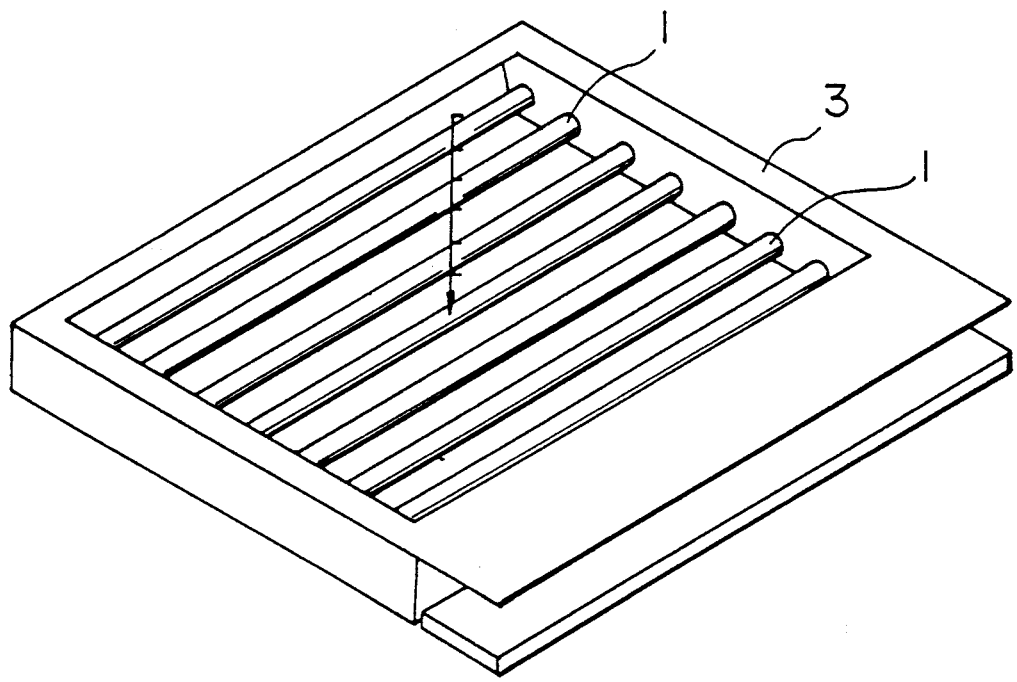
FIG. 3 is a schematic perspective view showing a backlight device used for a measurement of induced voltage.

In order to recognize digitally an electromagnetic shielding effect by the shielding member 5, respective intensities of induced voltages with respect to the distance between a voltage measuring probe (not shown) and the fluorescent lamps 1 were measured through a sample backlight device shown in FIG. 3. In the sample backlight device, seven pieces of fluorescent lamps each of whose diameter and length are 4 mm and 250 mm, respectively, were disposed in parallel and at the pitch of 10 mm to one another within the lamp case 3. The measurement of induced voltage was carried out at the center of the backlight device by the voltage measuring probe coupled with such a conductor as having 10 pF. The probe was moved from the portion spaced apart at 1 mm from a corresponding center fluorescent lamp to the portion spaced apart at 20 mm therefrom.

In the above-described sample backlight device and under the foregoing measured conditions, the cases one of which an electromagnetic shielding member is provided and the other of which the electromagnetic shielding member is not provided were compared with each other. In the case of measuring an electromagnetic shielding effect, the electro-magnetic shielding member was so arranged as to space apart at 1 mm from the fluorescent lamps 1.

Figure 4:
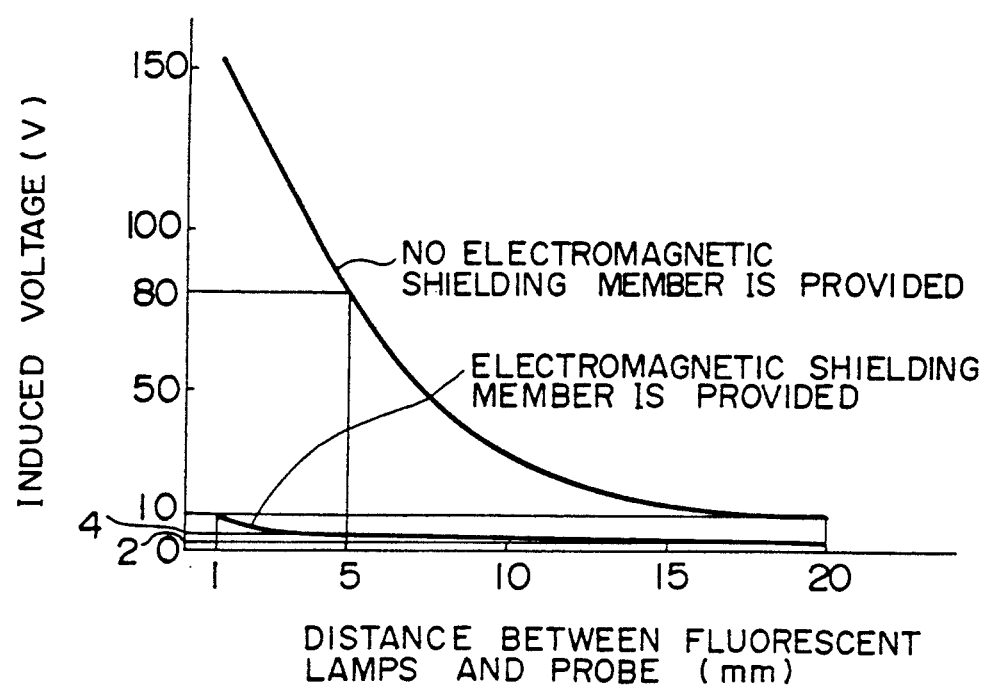
FIG. 4 is a graph showing a relationship between an induced voltage and the distance between fluorescent lamps and a probe.

The result of the measurements is as shown in FIG. 4 which is a graph showing a relationship between an induced voltage and the distance between the center fluorescent lamp and the voltage measuring probe. In FIG. 4, in case that no electromagnetic shielding member is provided, the induced voltages measured were 80V when the voltage measuring probe was disposed above the center fluorescent lamp so as to be spaced apart at 5 mm from the lamp and 10V when the probe was disposed thereabove so as to be spaced apart 20 mm therefrom. On the other hand, in case that the electromagnetic shielding member is provided, the induced voltages were 4V when the voltage measuring probe was disposed above the center fluorescent lamp so as to be spaced apart at 5 mm from the lamp and 2V when the prove was disposed thereabove so as to be spaced apart 20 mm therefrom.

As a result, it could be digitally recognized that provision of the electromagnetic shielding member brings the backlight device a high electromagnetic shielding effect.

Figure 5:
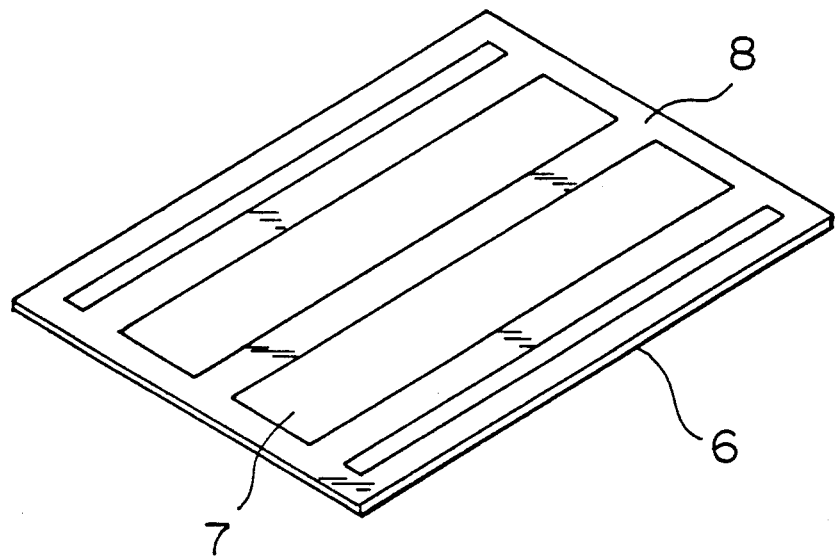
FIG. 5 is a schematic perspective view showing an aluminium pattern used in a second embodiment of the present invention.
Figure 6:
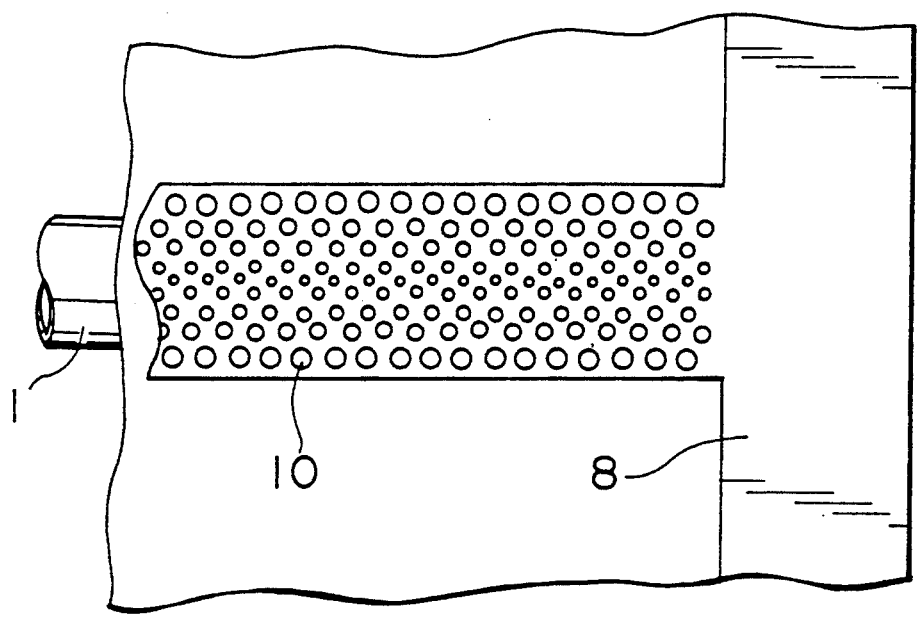
FIG. 6 is an enlarged, fragmentary top plane view of the aluminium pattern shown in FIG. 5.

As the fluorescent lamps and the liquid crystal display panel are drawn closer to each other, the intensity of electromagnetic field applied to the panel is increased. In particular, in case that the distance therebetween is less than 5 mm, an extremely deep striped pattern is generated in the liquid crystal display panel, so that it becomes impossible to read or understand characters or an image displayed in the panel. In such an extremely thin type of liquid crystal display equipment as described above, the aluminium pattern of the electromagnetic shielding member used in the first embodiment is changed to a different aluminium pattern as shown in FIG. 5. As is clearly understood from this second embodiment shown in FIG. 5, the aluminium pattern 8 is formed not only at all edge portions of the transparent polyester film 6 but also at such portions on the surface of the film 6 as corresponding to the fluorescent lamps, respectively, and each of which has a remarkably high intensity of electromagnetic shielding effect. In the second embodiment, it should be noted that the aluminium pattern formed at each of the portions respectively corresponding to the fluorescent lamps has a great number of light transmitting holes, as shown in FIG. 6, so as to prevent the aluminium pattern portion from deteriorating the luminous intensity. The size of each light transmitting hole is adjusted in proportion to the degree of luminous intensity.

When the electromagnetic shielding member of the second embodiment was used, it could prevent generation of a striped pattern in the liquid crystal display panel of a liquid crystal display equipment having the distance of 5 mm between the panel and the fluorescent lamps 1.

Figure 7:
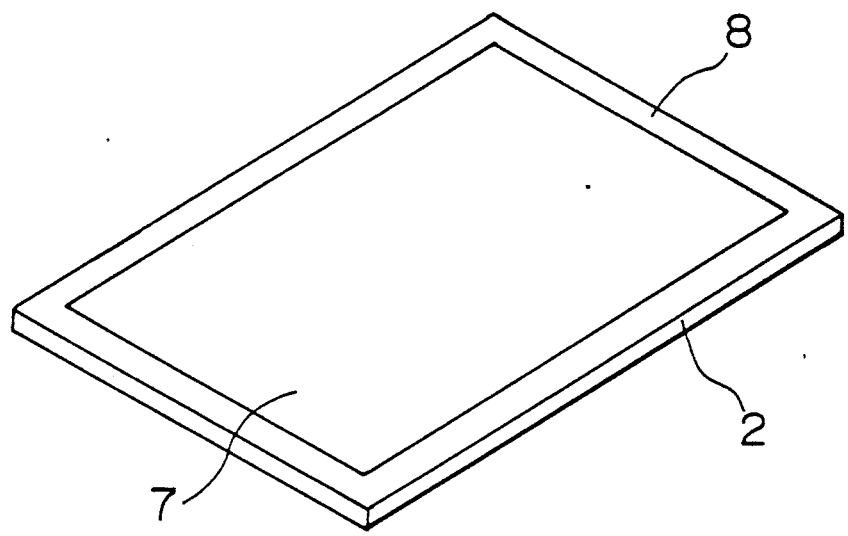
FIG. 7 is a schematic perspective view showing another electromagnetic shielding member used in a third embodiment of the present invention.

As is clearly understood from the foregoing description, such an exemplified feature as inserting the electromagnetic shielding member 5 whose substrate is a transparent polyester film is explained in the first and the second embodiments. Whilst, as shown in FIG. 7, it becomes possible to form the transparent conductive film 7 and the aluminium pattern 8 directly on the surface of the light diffusion plate 2 as a third embodiment. By this arrangement, it becomes possible to obtain such advantages as described below. Namely, the thickness of the polyester film used for the electromagnetic shielding member is removed, and further a light transmitting loss in the polyester film is eliminated. In this case, the same electromagnetic shielding effect as in the first and the second embodiments are obtained of course.

Figure 8:
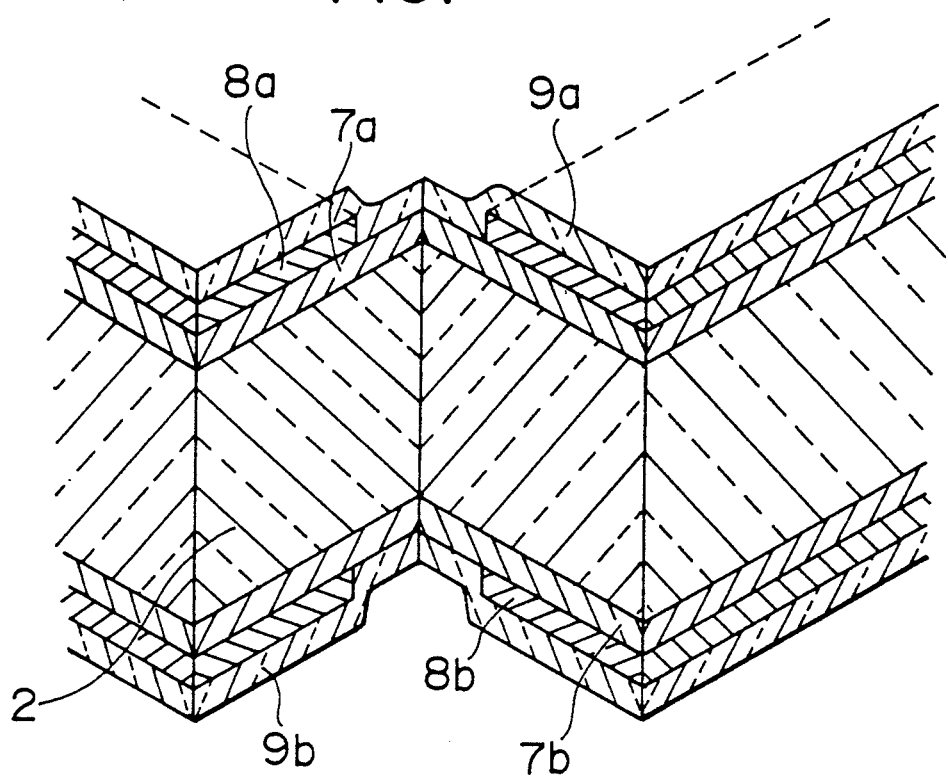
FIG. 8 is a fragmentary sectional perspective view showing still another electromagnetic shielding member used in a fourth embodiment of the present invention.

In addition, the electromagnetic shielding effect can be further improved by forming transparent conductive films 7(a), 7(b) and aluminium patterns 8(a), 8(b) on both the front and the rear surfaces of the light diffusion plate 2 or the transparent polyester film which is used as the substrate of the electromagnetic shielding member, respectively, as shown in FIG. 8 which is as a fourth embodiment of the present invention.

What is claimed is:

1. A backlight device comprising a plurality of fluorescent lamps arranged in parallel relationship to one another on a back side of a liquid crystal display panel as a backlight of said display panel, an electromagnetic shielding means mounted between the fluorescent lamps and the display panel, two transparent conductive films, one on each side of the electromagnetic shielding means, and a light diffusion plate between the display panel and the electromagnetic shielding means for diffusing the light irradiated from said fluorescent lamps to the liquid crystal display panel.

2. A backlight device comprising a plurality of fluorescent lamps arranged in parallel relationship to one another on a back side of a liquid crystal display panel as a backlight of said display panel, a light diffusion plate between the display and the fluorescent lamps for diffusing the light irradiated from said fluorescent lamps to the liquid crystal display panel, and two transparent conductive films, one on each side of the diffusion plate.

3. A backlight device comprising a plurality of fluorescent lamps arranged in parallel relationship to one another on a back side of a liquid crystal display panel as a backlight of said display panel, an electromagnetic shielding means mounted between the fluorescent lamps and the display panel, and a light diffusion plate between the display panel and the electromagnetic shielding means for diffusing the light irradiated from said fluorescent lamps to the liquid crystal display panel, said electromagnetic shielding means comprising a transparent polyester film, a transparent conductive film comprising indium tin oxide formed on a surface of the electromagnetic shielding means, an aluminum pattern formed on a surface of said indium tin oxide film, and a thin over-coating layer formed on and over surfaces of said aluminum pattern and said indium tin oxide film, wherein said aluminum pattern is so formed as to border all edge portions of said indium tin oxide film.

4. A backlight device as set forth in claim 3, wherein said aluminum pattern is formed at such portions of said indium tin oxide film as correspond to said fluorescent lamps.

5. A backlight device as set forth in claim 4, wherein said aluminum pattern has a great number of light transmitting holes each of whose size is adjusted in proportion to the degree of luminous intensity that passes therethrough.

6. A backlight device comprising a plurality of fluorescent lamps arranged in parallel relationship to one another on a back side of a liquid crystal display panel as a backlight of said display panel, an electromagnetic shielding means mounted between the fluorescent lamps and the display panel, and a light diffusion plate between the display panel and the electromagnetic shielding means for diffusing the light irradiated from said fluorescent lamps to the liquid crystal display panel, said electromagnetic shielding means comprising a transparent polyester film, a transparent conductive film comprising indium tin oxide formed on each surface of the electromagnetic shielding means, an aluminum pattern formed on a surface of each said indium tin oxide film, and a thin over-coating layer formed on and over surfaces of each of said aluminum pattern and said indium tin oxide films, wherein said aluminum patterns are so formed as to border all edge portions of said indium tin oxide films.

7. An electromagnetic shielding member comprising a transparent polyester film, a transparent conductive film formed on and over said polyester film, and an aluminum pattern formed on a surface of said conductive film, said aluminum pattern being so formed as to border all edge surfaces of said transparent conductive film.

* * * * *